(12) United States Patent
Vahdat et al.

(10) Patent No.: US 12,737,608 B2
(45) Date of Patent: Sep. 15, 2026

(54) DEEP HIERARCHICAL VARIATIONAL AUTOENCODER

(71) Applicant: NVIDIA CORPORATION, Santa Clara, CA (US)

(72) Inventors: Arash Vahdat, Mountain View, CA (US); Jan Kautz, Lexington, MA (US)

(73) Assignee: NVIDIA CORPORATION, Santa Clara, CA (US)

( * ) Notice: Subject to any disclaimer, the term of this patent is extended or adjusted under 35 U.S.C. 154(b) by 1131 days.

(21) Appl. No.: 17/089,492

(22) Filed: Nov. 4, 2020

(65) Prior Publication Data

US 2021/0397945 A1 Dec. 23, 2021

Related U.S. Application Data

(60) Provisional application No. 63/041,038, filed on Jun. 18, 2020.

(51) Int. Cl.

*G06N 3/08* (2023.01)
*G06N 3/04* (2023.01)
*G06N 3/0455* (2023.01)

(52) U.S. Cl.

CPC ................ *G06N 3/08* (2013.01); *G06N 3/04* (2013.01); *G06N 3/0455* (2023.01)

(58) Field of Classification Search

CPC ........... G06N 3/08; G06N 3/04; G06N 20/00; G06N 3/045; G06N 3/0455; G06N 3/047;

(Continued)

(56) References Cited

U.S. PATENT DOCUMENTS

2018/0101784 A1* 4/2018 Rolfe ...................... G06F 15/80
2019/0147339 A1* 5/2019 Nachum ................ G06N 20/00
706/25

(Continued)

FOREIGN PATENT DOCUMENTS

CN 109886388 A 6/2019
CN 110506278 A 11/2019

(Continued)

OTHER PUBLICATIONS

Lei Cai, Multi-Stage Variational Auto-Encoders for Coarse-to-Fine Image Generation, 2019, Proceedings of the 2019 SIAM International Conference on Data Mining (SDM), pp. 630-638 (Year: 2019).*

(Continued)

*Primary Examiner* — Kamran Afshar
(74) *Attorney, Agent, or Firm* — Artegis Law Group, LLP

(57) ABSTRACT

One embodiment of the present invention sets forth a technique for performing machine learning. The technique includes inputting a training dataset into a variational autoencoder (VAE) comprising an encoder network, a prior network, and a decoder network. The technique also includes training the VAE by updating one or more parameters of the VAE based on a smoothness of one or more outputs produced by the VAE from the training dataset. The technique further includes producing generative output that reflects a first distribution of the training dataset by applying the decoder network to one or more values sampled from a second distribution of latent variables generated by the prior network.

25 Claims, 7 Drawing Sheets

(58) Field of Classification Search
CPC ........ G06N 3/048; G06N 3/088; G06N 3/084; G06N 5/04
See application file for complete search history.

(56) References Cited

U.S. PATENT DOCUMENTS

| | | | | |
|---|---|---|---|---|
| 2019/0180732 | A1 | 6/2019 | Ping et al. | |
| 2019/0318244 | A1 | 10/2019 | Alvarez et al. | |
| 2019/0393903 | A1* | 12/2019 | Mandt | H03M 7/30 |
| 2020/0019859 | A1* | 1/2020 | Kyriazopoulou Panagiotopoulou | G06N 20/20 |
| 2020/0082534 | A1 | 3/2020 | Nikolov et al. | |
| 2020/0090050 | A1 | 3/2020 | Rolfe et al. | |
| 2020/0143240 | A1 | 5/2020 | Baker | |
| 2020/0380370 | A1* | 12/2020 | Lie | G06F 17/10 |

FOREIGN PATENT DOCUMENTS

| | | | |
|---|---|---|---|
| CN | 110533620 | A | 12/2019 |
| CN | 110895715 | A | 3/2020 |
| CN | 111243045 | A | 6/2020 |
| CN | 111258992 | A | 6/2020 |
| WO | 2019/067960 | A1 | 4/2019 |
| WO | 2019/079895 | A1 | 5/2019 |
| WO | 2020/064990 | A1 | 4/2020 |

OTHER PUBLICATIONS

Kingma et al., "Improved variational inference with inverse autoregressive flow", 2017, arXiv, v2, pp. 1-16 (Year: 2017).*
Yoshida et al., "Spectral norm regularization for improving the generalizability of deep learning", 2017, arXiv, v1, pp. 1-12 (Year: 2017).*
Hou et al., "Deep Feature Consistent Variational Autoencoder", 2017, 2017 IEEE Winter Conference on Applications of Computer Vision (WACV), vol. 2017, pp. 1133-1141 (Year: 2017).*
Chollet, "Xception: Deep Learning With Depthwise Separable Convolutions", 2017, Proceedings of the IEEE Conference on Computer Vision and Pattern Recognition (CVPR), vol. 2017, pp. 1251-1258 (Year: 2017).*
Ioffe, "Batch Renormalization: Towards Reducing Minibatch Dependence in Batch-Normalized Models", 2017, Advances in Neural Information Processing Systems, vol. 30 (2017), pp. 1-9 (Year: 2017).*
Ramachandran et al., "Searching for Activation Functions", 2017, arXiv, v2, pp. 1-13 (Year: 2017).*
Hu et al., "Squeeze-and-Excitation Networks", 2019, arXiv, v4, pp. 1-13 (Year: 2019).*
Micikevicius et al., "Mixed Precision Training", 2017, arXiv, v3, pp. 1-12 (Year: 2017).*
Miyato et al., "Spectral normalization for generative adversarial networks", 2018, arXiv, v1, pp. 1-26 (Year: 2018).*
Li et al., "Leaf Classification Utilizing Densely Connected Convolutional Networks with a Self-gated Activation Function", 2018, Intelligent Computing Methodologies, vol. 2018, pp. 370-375 (Year: 2018).*
Liu et al., "Evolving Normalization-Activation Layers", Jun. 11, 2020, arXiv, v4, pp. 1-16 (Year: 2020).*
Gulati et al., "ResU-Net: Residual Convolutional Neural Network for Prostate MRI Segmentation", May 16, 2020, arXiv, v1, pp. 1-5 (Year: 2020).*
Howard et al., "MobileNets: Efficient Convolutional Neural Networks for Mobile Vision Applications", 2017, arXiv, v1, pp. 1-9 (Year: 2019).*
Sandler et al., "MobileNetV2: Inverted Residuals and Linear Bottlenecks", 2018, Proceedings of the IEEE Conference on Computer Vision and Pattern Recognition (CVPR), vol. 2018, pp. 4510-4520 (Year: 2018).*
Razavi et al., "Generating Diverse High-Fidelity Images with VQ-VAE-2", 2019, Advances in Neural Information Processing Systems 32, vol. 32, pp. 1-11 (Year: 2019).*
Van Laarhoven, "L2 Regularization versus Batch and Weight Normalization", 2017, arXiv, v1, pp. 1-9 (Year: 2017).*
Luo et al., "Towards Understanding Regularization in Batch Normalization", 2019, arXIv, v4, pp. 1-23 (Year: 2019).*
Chen et al., "Training Deep Nets with Sublinear Memory Cost", 2016, arXIv, v2, pp. 1-12 (Year: 2016).*
Xie et al., "SRUN: Spectral Regularized Unsupervised Networks for Hyperspectral Target Detection", 2019, IEEE Transactions on Geoscience and Remote Sensing, vol. 58, pp. 1463-1474 (Year: 2019).*
Yu et al., "Survey of Multi-Task Learning", Chinese Journal of Computers, DOI 10.11897/SP.J1016.2020.01340, vol. 43, No. 7, Jul. 2020, pp. 1340-1378.
He et al., "Identity Mappings in Deep Residual Networks", In European conference on computer vision, DOI: 10.1007/978-3-319-46493-0 38, Springer, 2016, pp. 630-645.
Chen et al., "Training Deep Nets with Sublinear Memory Cost", arXiv:1604.06174, 2016, pp. 1-12.
Martens et al., "Training Deep and Recurrent Networks with Hessian-Free Optimization", In Neural networks: Tricks of the Trade, Springer, 2012, pp. 479-535.
Yoshida et al., "Spectral Norm Regularization for Improving the Generalizability of Deep Learning", arXiv: 1705.10941, 2017, pp. 1-12.
Miyato et al., "Spectral normalization for generative adversarial networks", In International Conference on Learning Representations, 2018, pp. 1-26.
Chen et al., "VFlow: More Expressive Generative Flows with Variational Data Augmentation", arXiv:2002.09741, 2020, 16 pages.
Huang et al., "Augmented Normalizing Flows:Bridging the Gap Between Generative Flows and Latent Variable Models", arXiv:2002.07101, 2020, 27 pages.
Ho et al., "Flow++: Improving Flow-Based Generative Models with Variational Dequantization and Architecture Design", In Proceedings of the 36th International Conference on Machine Learning, arXiv: 1902.00275, 2019, 16 bages.
Kingma et al., "Glow: Generative flow with Invertible 1x1 Convolutions", In Advances in Neural Information Processing Systems, arXiv:1807.03039, 2018, pp. 10236-10245.
Dinh et al., "Density Estimation Using Real NVP", arXiv:1605.08803, ICLR, 2016, pp. 1-32.
Tomczak et al., "VAE with a VampPrior", In International Conference on Artificial Intelligence and Statistics, vol. 84, 2018, pp. 1214-1223.
Ma et al., "MAE: Mutual posterior-divergence regularization for variational autoencoders", In The International Conference on Learning Representations (ICLR), arXiv:1901.01498, 2019, pp. 1-16.
Chen et al., "Variational Lossy Autoencoder", arXiv:1611.02731, 2016, pp. 1-17.
Ma et al., "MaCow: Masked Convolutional Generative Flow", In Advances in Neural Information Processing Systems, arXiv:1902.04208, 2019, pp. 1-18.
Menick et al., "Generating high fidelity images with subscale pixel networks and multidimensional upscaling", In International Conference on Learning Representations, arXiv:1812.01608, 2019, pp. 1-15.
Parmar et al., "Image Transformer", In Proceedings of the 35th International Conference on Machine Learning, 2018, 10 pages.
Salimans et al., "PixelCNN++: Improving the pixelCNN with discretized logistic mixture likelihood and other modifications", arXiv:1701.05517, 2017, pp. 1-10.
Oord et al., "Conditional Image Generation with PixelCNN Decoders", In Advances in Neural Information Processing Systems, 2016, pp. 4790-4798.
Lecun, Yann, "The Mnist Database of handwritten digits", Retrieved from http://yann.lecun.com/exdb/mnist/, 1998, 7 pages.
Krizhevsky, Alex, "Learning Multiple Layers of Features from Tiny Images", Apr. 8, 2009, 60 pages.

(56) References Cited

OTHER PUBLICATIONS

Deng et al., "ImageNet: A Large-Scale Hierarchical Image Database", In Computer Vision and Pattern Recognition (CVPR), 2009, pp. 248-255.
Karras et al., "A Style-Based Generator Architecture for Generative Adversarial Networks", In Proceedings of the EEE Conference on Computer Vision and Pattern Recognition, 2019, pp. 4401-4410.
Brock et al., "Large scale GAN training for high fidelity natural image synthesis", In International Conference on Learning Representations, arXiv:1809.11096, 2019, pp. 1-35.
Radford et al., "Unsupervised representation learning with deep convolutional generative adversarial networks", arXiv:1511.06434, 2015, pp. 1-16.
Grover et al., "Bias Correction of Learned Generative Models using Likelihood-Free ImportanceWeighting", In Advances in Neural Information Processing Systems, 2019, pp. 11056-11068.
Kingma et al., "Adam: A method for stochastic optimization", arXiv: 1412.6980, 2014, pp. 1-15.
Bjorck et al., "Understanding Batch Normalization", 32nd Conference on Neural Information Processing Systems, 2018, pp. 1-12.
Oberman et al., "Lipschitz Regularized Deep Neural Networks Converge and Generalize", Oct. 3, 2018, pp. 1-17.
Kingma et al., "Auto-Encoding Variational Bayes", In the International Conference on Learning Representations (ICLR), arXiv:1312.6114, 2014, 14 pages.
Rezende et al., "Stochastic Backpropagation and Approximate Inference in Deep Generative Models", In International Conference on Machine Learning, vol. 32, 2014, pp. 1278-1286.
Rezende et al., "Variational Inference with Normalizing Flows", arXiv:1505.05770, vol. 37, 2015, 10 pages.
Kingma et al., "Improved Variational Inference with Inverse Autoregressive Flow", In Advances in Neural Information Processing Systems, 2016, pp. 4743-4751.
Gregor et al., Draw: A Recurrent Neural Network for Image Generation, In 32nd International Conference on Machine Learning, vol. 37, 2015, pp. 1462-1471.
Cremer et al., "Inference Suboptimality in Variational Autoencoders", In Proceedings of the 35th International Conference on Machine Learning, arXiv:1801.03558, 2018, 12 pages.
Marino et al., "Iterative Amortized Inference", In Proceedings of the 35th International Conference on Machine earning, 2018, 10 pages.
MaalØe et al., "Auxiliary Deep Generative Models", In Proceedings of the 33rd International Conference on Machine Learning, arXiv:1602.05473, 2016, 9 pages.
Ranganath et al., "Hierarchical Variational Models", In Proceedings of the 33rd International Conference on Machine Learning, 2016, 10 pages.
Vahdat et al., "Undirected Graphical Models as Approximate Posteriors", In International Conference on Machine Learning (ICML), arXiv:1901.03440, 2020, 13 pages.
Burda et al., "Importance Weighted Autoencoders", ICLR 2016, arXiv:1509.00519, 2015, 14 pages.
Li et al., "Rényi Divergence Variational Inference", In Advances in Neural Information Processing Systems, 2016, pp. 1073-1081.
Bornschein et al., "Bidirectional Helmholtz Machines", In International Conference on Machine Learning, 2016, pp. 2511-2519.
Masrani et al., "The Thermodynamic Variational Objective", In Advances in Neural Information Processing Systems, 2019, pp. 11521-11530.
Roeder et al., "Sticking the Landing: Simple, Lower-Variance Gradient Estimators for Variational Inference", In Advances in Neural Information Processing Systems, arXiv:1703.09194, 2017, pp. 6925-6934.
Tucker et al., "Doubly Reparameterized Gradient Estimators for Monte Carlo Objectives", arXiv:1810.04152, 2018, pp. 1-14.
Maddison et al., "The Concrete Distribution: A Continuous Relaxation of Discrete Random Variables", ICLR, arXiv:1611.00712, 2016, pp. 1-20.
Jang et al., "Categorical Reparameterization with Gumbel-Softmax", arXiv:1611.01144, ICLR, 2016, pp. 1-13.
Rolfe, Jason Tyler, "Discrete Variational Autoencoders", arXiv:1609.02200, ICLR, 2016, pp. 1-33.
Vahdat et al., "DVAE++: Discrete Variational Autoencoders with Overlapping Transformations", In International Conference on Machine Learning (ICML), arXiv:1802.04920, 2018, 16 pages.
Vahdat et al., "DVAE#: Discrete Variational Autoencoders with Relaxed Boltzmann Priors", In Neural Information Processing Systems, arXiv:1805.07445, 2018, pp. 1-11.
Tucker et al., "REBAR: Low-variance, unbiased gradient estimates for discrete latent variable models", In 31st Conference on Neural Information Processing Systems, 2017, pp. 2624-2633.
Grathwohl et al., "Backpropagation Through the Void: Optimizing Control Variates for Black-Box Gradient Estimation", In International Conference on Learning Representations (ICLR), arXiv:1711.00123, 2018, pp. 1-17.
Bowman et al., "Generating Sentences from a Continuous Space", In Proceedings of The 20th SIGNLL Conference on Computational Natural Language Learning, arXiv:1511.06349, 2016, pp. 10-21.
Razavi et al., "Preventing Posterior Collapse with delta-VAEs", In The International Conference on Learning Representations (ICLR), arXiv:1901.03416, 2019, pp. 1-24.
Gulrajani et al., "PixelVAE: A Latent Variable Model for Natural Images", arXiv:1611.05013, 2016, pp. 1-9.
Lucas et al., "Don't Blame the Elbo! A Linear VAE Perspective on Posterior Collapse", In Advances in Neural Information Processing Systems, arXiv:1911.02469, 2019, pp. 1-21.
Karras et al., "Progressive Growing of GANs for Improved Quality, Stability, and Variation", In International Conference on Learning Representations, arXiv:1710.10196, 2018, pp. 1-26.
Barber et al., "Information Maximization in Noisy Channels : A Variational Approach", In Advances in Neural Information Processing Systems, 2004, 8 pages.
Alemi et al., "Deep Variational Information Bottleneck", In The International Conference on Learning Representations (ICLR), 2017, pp. 1-19.
Schwartz-Ziv et al., "Opening the black box of Deep Neural Networks via Information", arXiv: 1703.00810, 2017, pp. 1-19.
Wu et al., "On the quantitative analysis of decoder-based generative models", In The International Conference on Learning Representations (ICLR), arXiv:1611.04273, 2017, pp. 1-17.
Dieleman et al., "The challenge of realistic music generation:modelling raw audio at scale", In Advances in Neural Information Processing Systems, 2018, pp. 7989-7999.
Chen et al., "PixelSNAIL: An Improved Autoregressive Generative Model", In International Conference on Machine Learning, 2018, 9 pages.
Sadeghi et al., "PixelVAE++: Improved PixelVAE with Discrete Prior", arXiv:1908.09948, 2019, pp. 1-12.
MaalØe et al., et al., "BIVA: A Very Deep Hierarchy of Latent Variables for Generative Modeling", In 33rd Conference on Neural Information Processing Systems, 2019, pp. 6548-6558.
Ioffe et al., "Batch Normalization: Accelerating Deep Network Training by Reducing Internal Covariate Shift", In 32nd International Conference on Machine Learning, vol. 37, 2015, pp. 448-456.
Chollet, Francois, "Xception: Deep Learning with Depthwise Separable Convolutions", In Proceedings of the IEEE Conference on Computer Vision and Pattern Recognition, arXiv:1610.02357, 2017, pp. 1251-1258.
Razavi et al., "Generating Diverse High-Fidelity Images with VQ-VAE-2", In Advances in Neural Information Processing Systems, 2019, pp. 14837-14847.
Oord et al., "Pixel Recurrent Neural Networks", In Proceedings of the 33rd International Conference on International Conference on Machine Learning, JMLR. org, vol. 48, 2016, pp. 1747-1756.
SØnderby et al., "Ladder Variational Autoencoders", In 30th Conference on Neural Information Processing Systems, 2016, pp. 3738-3746.
Klushyn et al., "Learning Hierarchical Priors in VAEs", In 33rd Conference on Neural Information Processing Systems, arXiv:1905.04982, 2019, pp. 1-17.
He et al., "Deep Residual Learning for Image Recognition", In Computer Vision and Pattern Recognition, DOI 10.1109/CVPR.2016.90, 2016, pp. 770-778.

(56) References Cited

OTHER PUBLICATIONS

Sandler et al., "MobileNetV2: Inverted Residuals and Linear Bottlenecks", In Proceedings of the IEEE conference on computer vision and pattern recognition, DOI 10.1109/CVPR.2018.00474, 2018, pp. 4510-4520.
Salimans et al., "Weight Normalization: A Simple Reparameterization to Accelerate Training of Deep Neural Networks", In 30th Conference on Neural Information Processing Systems, 2016, pp. 1-9.
Ramachandran et al., "Searching for Activation Functions", arXiv:1710.05941, 2017, pp. 1-13.
Tan et al., "EfficientNet: Rethinking Model Scaling for Convolutional Neural Networks", In Proceedings of the 36th International Conference on Machine Learning, 2019, pp. 6105-6114.
Chen et al., "Residual Flows for Invertible Generative Modeling", In Advances in Neural Information Processing Systems, arXiv:1906.02735, 2019, pp. 1-21.
Clevert et al., "Fast and accurate deep network learning by exponential linear units (ELUs)", arXiv:1511.07289, 2015, pp. 1-14.
Hu et al., "Squeeze-and-Excitation Networks", arXiv: 1709.01507, 2017, pp. 1-13.

* cited by examiner

DEEP HIERARCHICAL VARIATIONAL AUTOENCODER

CROSS-REFERENCE TO RELATED APPLICATIONS

This application claims benefit of the U.S. Provisional Application titled "DEEP HIERARCHICAL VARIATIONAL AUTOENCODERS," filed Jun. 18, 2020 and having Ser. No. 63/041,038. The subject matter of this related application is hereby incorporated herein by reference.

BACKGROUND

Field of the Various Embodiments

Embodiments of the present disclosure relate generally to generative machine learning models, and more specifically, to a deep hierarchical variational autoencoder.

Description of the Related Art

In machine learning, generative models include deep neural networks and/or other types of machine learning models that are trained to generate new instances of data. For example, a generative model may be trained on a dataset that includes a large number of images of cats. The generative model may then be used to produce new images of cats that are not found in the training dataset.

Generative models include variational autoencoders (VAEs), which learn a distribution of data in a training dataset and subsequently generate new data by sampling from the distribution. A VAE typically includes two neural networks: an encoder network that converts data points in the training dataset into a lower-dimensional latent space, and a decoder network that converts data points in the latent space into a probability distribution of data in the training dataset. New data that is similar to data points in the training dataset may be generated by inputting samples from the latent space into the decoder network, which converts the samples into data points that reflect attributes corresponding to latent variable values in the latent space.

For example, a VAE that is trained on images of cats may learn a distribution of latent variables reflecting correlations among pixels in the images that are representative of cats (e.g., appearances of the cats' faces, fur, bodies, expressions, poses, etc. in the images). Additional images of cats not in the training dataset may then be generated by sampling from the distribution of latent variables learned by the encoder network in the VAE and using the decoder network to convert the sampled latent variable values into distributions of pixel values in the images and sampling the pixel values from the distributions.

Among generative models, VAEs tend to provide efficient Bayesian inference and sampling but typically have lower performance than other types of generative models. For example, images produced by a VAE tend to be blurrier than those of other types of generative models.

As the foregoing illustrates, what is needed in the art are techniques for improving the performance of VAEs.

SUMMARY

One embodiment of the present invention sets forth a technique for performing machine learning. The technique includes inputting a training dataset into a variational autoencoder (VAE) comprising an encoder network, a prior network, and a decoder network. The technique also includes training the VAE by updating one or more parameters of the VAE based on a smoothness of one or more outputs produced by the VAE from the training dataset. The technique further includes producing generative output that reflects a first distribution of the training dataset by applying the decoder network to one or more values sampled from a second distribution of latent variables generated by the prior network.

One technological advantage of the disclosed techniques is faster convergence and/or better generative performance of the VAE than conventional techniques for creating, training, and/or executing VAEs. Thus, by reducing resource overhead and/or improving performance associated with training and/or executing the VAE, the disclosed techniques provide technological improvements in computer systems, applications, frameworks, and/or techniques for training and executing generative models, generating content, augmenting data, rendering computer graphics, and/or performing representation or feature learning.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
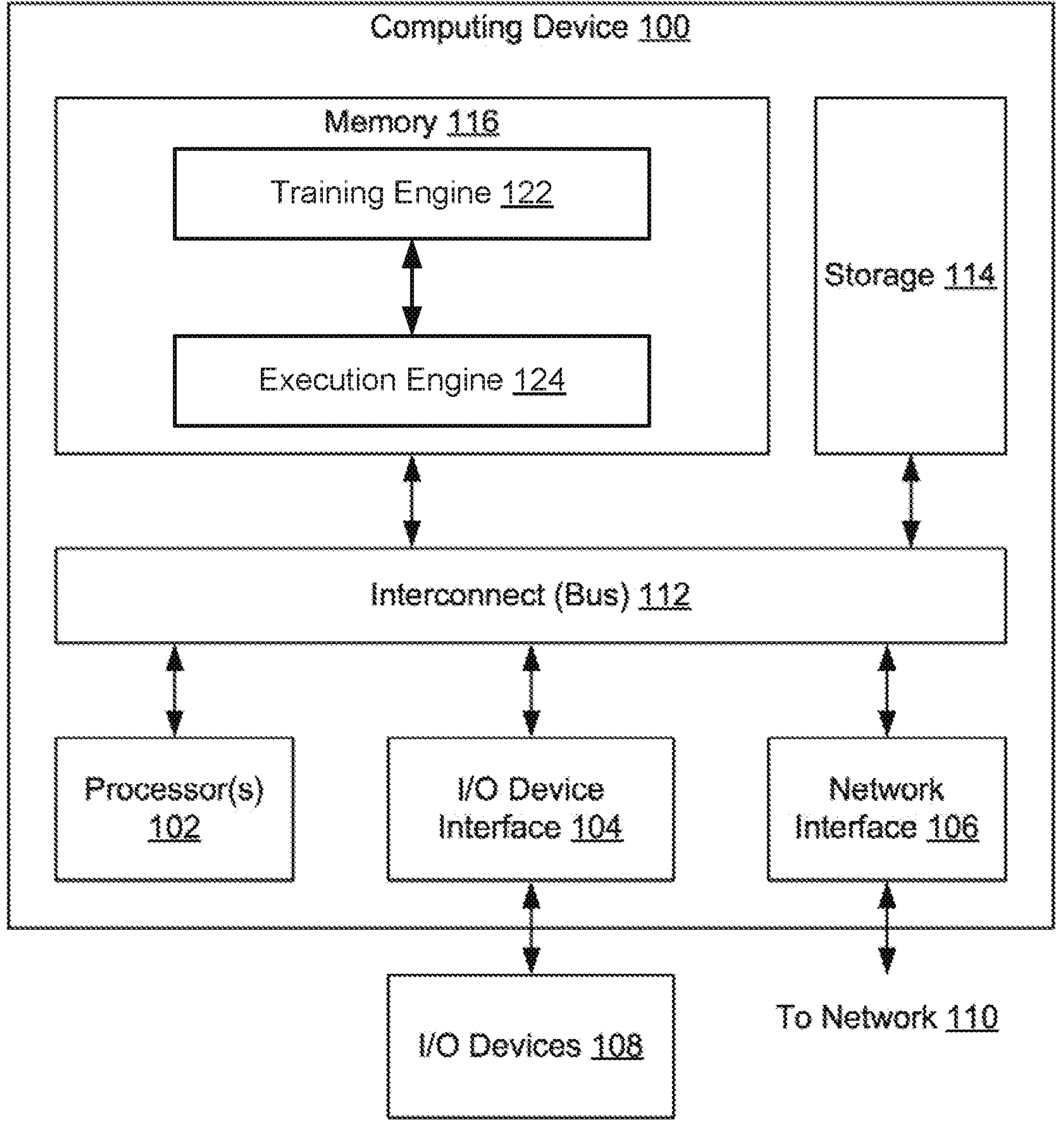
FIG. 1 illustrates a computing device configured to implement one or more aspects of various embodiments.

In the following description, numerous specific details are set forth to provide a more thorough understanding of the various embodiments. However, it will be apparent to one of skilled in the art that the inventive concepts may be practiced without one or more of these specific details.

General Overview

A variational autoencoder (VAE) is a type of generative model that "learns" the distribution of data points in a training dataset. A VAE includes two neural networks: an encoder network that converts data points in the training dataset into a lower-dimensional latent space, and a decoder network that converts data points in the latent space into a probability distribution of data in the training dataset. The VAE may then be used to generate new data points that have similarities with the data points in the training dataset but are not found in the training dataset.

VAEs may be used in many different real-world applications involving content generation (e.g., producing images, text, music, and/or other content that can be used in advertisements, publications, games, videos, and/or other types of media). For example, a VAE may be trained on a large set of images of human faces. The encoder network in the trained VAE may learn a distribution of latent (i.e., “hidden”) variables that represent visual attributes of human faces (e.g., skin tone, hairstyles, facial features, facial expressions, visible clothing, jewelry, etc.), as found in correlations among pixels in the images. Additional images of human faces not in the training dataset may then be generated by selecting values from the ranges of latent variable values learned by the encoder network in the VAE and using the decoder network to convert the selected latent variable values into pixel values in the images.

VAEs are also often used in computer graphics (e.g., rendering characters, objects, and/or scenes without explicitly creating or specifying the corresponding models); data augmentation (e.g., altering the appearance of a person in an image by adjusting latent variables outputted by the encoder network from the image and using the decoder network to convert the adjusted latent variables into a new image, using the VAE to generate new samples of training data for another machine learning model, etc.); and/or representation or feature learning (e.g., encoding visual attributes of faces, animals, and/or objects into latent variables that can be varied or analyzed to better understand the attributes).

The training and generative performance of a VAE may be improved by a number of techniques. First, the VAE may include a hierarchical structure, where each level of the hierarchical structure includes a grouping of latent variables and a sample from a given group at a level of the hierarchy is passed with a feature map as input into the next level for sampling of the corresponding group at the next level. This hierarchical arrangement of latent variables in the VAE may allow earlier levels of the hierarchy to capture long-range correlations across the training dataset (e.g., left-right symmetry and/or uniform skin tone in images of faces) and later levels of the hierarchy to encode fine-grained dependencies within data points in the training dataset (e.g., facial expressions, eye and hair color, face shape, facial hair, glasses, etc.).

Second, each level of the hierarchy includes a residual cell with a number of layers that are selected and arranged to improve the training and performance of the VAE. For example, residual cells in the encoder network may include a different arrangement of layers than in a conventional residual cell to improve the performance of the VAE in converting input data into a latent representation. In another example, residual cells in the decoder network may include a number of layers that increase the number of channels and a depthwise separable convolution layer that is applied to the increased number of channels to improve the receptive field of the decoder network without significantly increasing the computational complexity of the decoder network.

Third, the VAE may be trained in a manner that is memory efficient and reduces instability associated with hierarchical sampling of latent variables. For example, a spectral regularization term that controls the smoothness of the output of the VAE may be added to the objective function used to update the parameters of the encoder and/or decoder networks. This spectral regularization term can be used to bound one or more terms of the objective function during updates to the encoder and/or decoder parameters, thus reducing instability during training of the VAE. In another example, parameters of the VAE may be selectively stored using different levels of precision and/or discarded and subsequently recalculated to reduce the memory footprint associated with training the VAE. Consequently, the VAE may have better performance and efficiency during training and sampling of new data than conventional VAEs that do not utilize these techniques.

System Overview

FIG. 1 illustrates a computing device 100 configured to implement one or more aspects of various embodiments. In one embodiment, computing device 100 may be a desktop computer, a laptop computer, a smart phone, a personal digital assistant (PDA), tablet computer, or any other type of computing device configured to receive input, process data, and optionally display images, and is suitable for practicing one or more embodiments. Computing device 100 is configured to run a training engine 122 and execution engine 124 that reside in a memory 116. It is noted that the computing device described herein is illustrative and that any other technically feasible configurations fall within the scope of the present disclosure. For example, multiple instances of training engine 122 and execution engine 124 may execute on a set of nodes in a distributed and/or cloud computing system to implement the functionality of computing device 100.

In one embodiment, computing device 100 includes, without limitation, an interconnect (bus) 112 that connects one or more processors 102, an input/output (I/O) device interface 104 coupled to one or more input/output (I/O) devices 108, memory 116, a storage 114, and a network interface 106. Processor(s) 102 may be any suitable processor implemented as a central processing unit (CPU), a graphics processing unit (GPU), an application-specific integrated circuit (ASIC), a field programmable gate array (FPGA), an artificial intelligence (AI) accelerator, any other type of processing unit, or a combination of different processing units, such as a CPU configured to operate in conjunction with a GPU. In general, processor(s) 102 may be any technically feasible hardware unit capable of processing data and/or executing software applications. Further, in the context of this disclosure, the computing elements shown in computing device 100 may correspond to a physical computing system (e.g., a system in a data center) or may be a virtual computing instance executing within a computing cloud.

In one embodiment, I/O devices 108 include devices capable of providing input, such as a keyboard; a mouse, a touch-sensitive screen, and so forth, as well as devices capable of providing output, such as a display device. Additionally, I/O devices 108 may include devices capable of both receiving input and providing output, such as a touchscreen, a universal serial bus (USB) port, and so forth. I/O devices 108 may be configured to receive various types of input from an end-user (e.g., a designer) of computing device 100, and to also provide various types of output to the end-user of computing device 100, such as displayed digital images or digital videos or text. In some embodiments, one or more of I/O devices 108 are configured to couple computing device 100 to a network 110.

In one embodiment, network 110 is any technically feasible type of communications network that allows data to be exchanged between computing device 100 and external entities or devices, such as a web server or another networked computing device. For example, network 110 may include a wide area network (WAN), a local area network (LAN), a wireless (WiFi) network, and/or the Internet, among others.

In one embodiment, storage 114 includes non-volatile storage for applications and data, and may include fixed or removable disk drives, flash memory devices, and CD-ROM, DVD-ROM, Blu-Ray, HD-DVD, or other magnetic, optical, or solid state storage devices. Training engine 122 and execution engine 124 may be stored in storage 114 and loaded into memory 116 when executed.

In one embodiment, memory 116 includes a random access memory (RAM) module, a flash memory unit, or any other type of memory unit or combination thereof. Processor(s) 102, I/O device interface 104, and network interface 106 are configured to read data from and write data to memory 116. Memory 116 includes various software programs that can be executed by processor(s) 102 and application data associated with said software programs, including training engine 122 and execution engine 124.

Training engine 122 includes functionality to train a variational autoencoder (VAE) on a training dataset, and execution engine 124 includes functionality to execute one or more portions of the VAE to generate additional data that is not found in the training dataset. For example, training engine 122 may train encoder, prior, and/or decoder networks in the VAE on a set of training images, and execution engine 124 may execute a generative model that includes the trained prior and decoder networks to produce additional images that are not found in the training images. As described in further detail below, training engine 122 and execution engine 124 may use a number of techniques to improve the efficiency and performance with which the VAE is trained and executed.

Deep Hierarchical Variational Autoencoder

Figure 2:
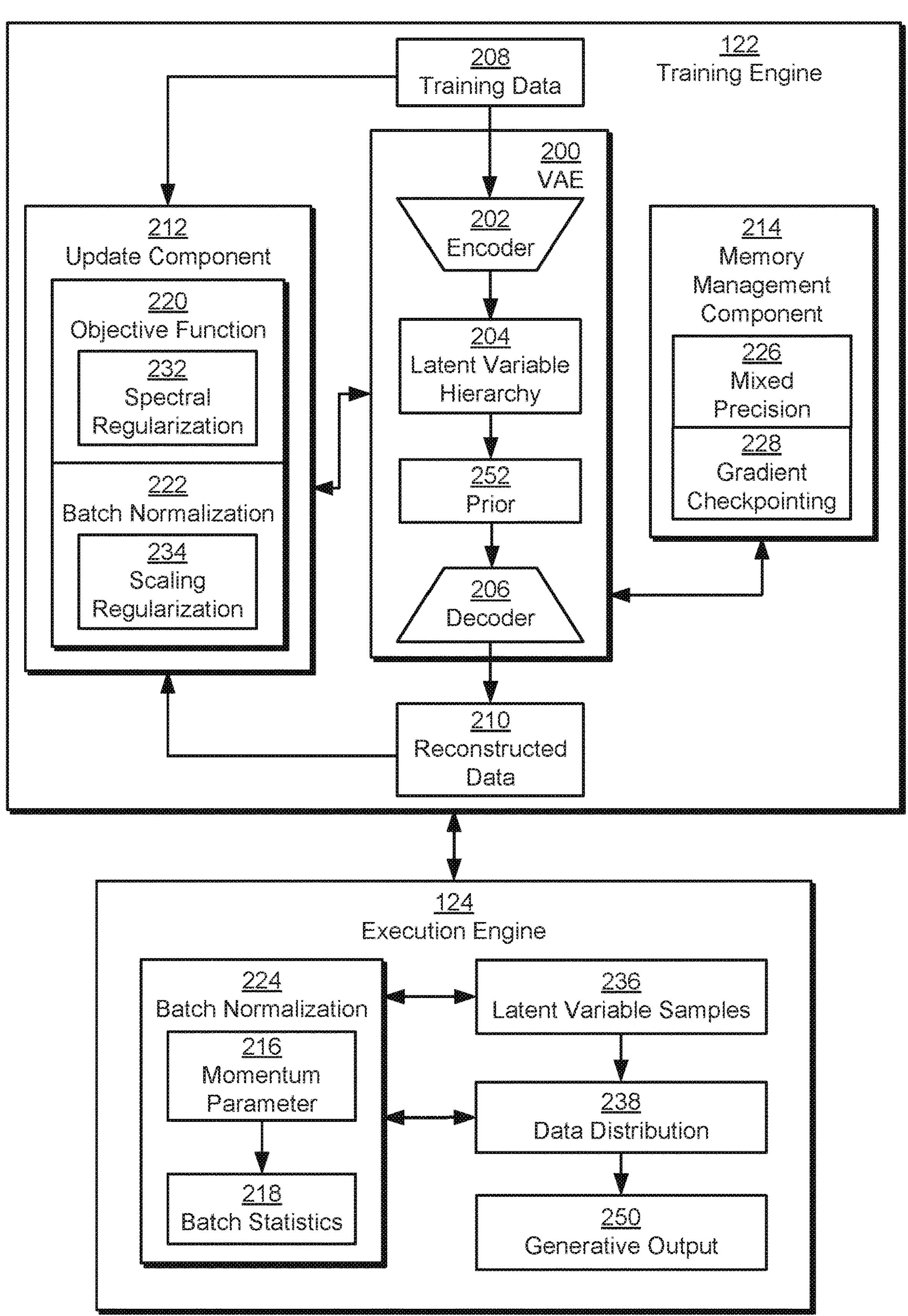
FIG. 2 is a more detailed illustration of the training engine and execution engine of FIG. 1, according to various embodiments.

FIG. 2 is a more detailed illustration of training engine 122 and execution engine 124 of FIG. 1, according to various embodiments. Training engine 122 trains a VAE 200 that learns a distribution of a dataset of training data 208, and execution engine 124 executes one or more portions of VAE 200 to produce generative output 250 that includes additional data points in the distribution that are not found in training data 208.

As shown, VAE 200 includes a number of neural networks: an encoder 202, a prior 252, and a decoder 206. Encoder 202 "encodes" a set of training data 208 into latent variable values, prior 252 learns the distribution of latent variables outputted by encoder 202, and decoder 206 "decodes" latent variable values sampled from the distribution into reconstructed data 210 that substantially reproduces training data 206. For example, training data 208 may include images of human faces, animals, vehicles, and/or other types of objects. Encoder 202 may convert pixel values in each image into a smaller number of latent variables representing inferred visual attributes of the objects and/or images (e.g., skin tones, hair colors and styles, shapes and sizes of facial features, gender, facial expressions, and/or other characteristics of human faces in the images), prior 252 learns the means and variances of the distribution of latent variables across multiple images in training data 206, and decoder 202 may convert latent variables sampled from the latent variable distribution and/or outputted by encoder 202 into reconstructions of images in training data 206.

The generative operation of VAE 200 may be represented using the following probability model:

$$p(x, z) = p(z)p(x \mid z),$$

where p(z) is a prior distribution learned by prior 252 over latent variables z and p(x|z) is the likelihood function, or decoder 202, that generates data x given latent variables z. In other words, latent variables are sampled from prior 252 p(z), and the data x has a likelihood that is conditioned on the sampled latent variables z. The probability model includes a posterior p(z|x), which is used to infer values of the latent variables z. Because p(z|x) is intractable, another distribution q(z|x) learned by encoder 202 is used to approximate p(z|x).

In some embodiments, VAE 200 is a hierarchical VAE that uses deep neural networks for encoder 202, prior 252, and decoder 206. The hierarchical VAE includes a latent variable hierarchy 204 that partitions latent variables into a sequence of disjoint groups. Within latent variable hierarchy 204, a sample from a given group of latent variables is combined with a feature map and passed to the following group of latent variables in the hierarchy for use in generating a sample from the following group.

Continuing with the above probability model, partitioning of the latent variables may be represented by $z=\{z_1, z_2, \ldots, z_L\}$, where L is the number of groups. Within latent variable hierarchy 204, prior 252 is represented by $p(z)=\Pi_l p(z_l|z_{<l})$, and the approximate posterior is represented by $q(z|x)=\Pi_l q(z_l|z_{<l}, x)$, where each conditional $p(z_l|z_{<l})$ in the prior and each conditional $q(z_l|z_{<l}, x)$ in the approximate posterior are represented by factorial Normal distributions.

In some embodiments, encoder 202 includes a bottom-up model and a top-down model that perform bidirectional inference of the groups of latent variables based on training data 208. The top-down model is then reused as prior 252 to infer latent variable values that are inputted into decoder 206 to produce reconstructed data 210 and/or generative output 240. The architectures of encoder 202 and decoder 206 are described in further detail below with respect to FIGS. 3A-3B.

As shown, training engine 122 includes an update component 212 that updates parameters of encoder 202, prior 252, and decoder 206 based on an objective function 220 that is calculated based on the probability model representing VAE 200 and an error between training data 208 and reconstructed data 210. In some embodiments, objective function 220 includes an evidence lower bound to be maximized with the following form:

$$\mathcal{L}_{VAE}(x) := \mathbb{E}_{q(z|x)}\left[\log p(x \mid z) - KL(q(z_1 \mid x) \,\|\, p(z_1)) - \sum_{l=2}^{L} \mathbb{E}_{q(z<l|x)}[KL(q(z_l \mid x, z_{<l}) \,\|\, p(z_l \mid z_{<l}))]\right], \quad (1)$$

where $$q(z < l \mid x) := \prod_{i=1}^{l-1} q(z_i \mid x, z_{<i})$$

is the approximate posterior up to the (l−1)th group. In addition, log p(x|z) is the log-likelihood of observed data x given the sampled latent variables z; this term is maximized when p(x|z) assigns high probability to the original data x (i.e., when decoder 206 tries to reconstruct a data point x in training data 208 given latent variables z generated by encoder 202 from the data point). The "KL" terms in the equation represent Kullback-Leibler (KL) divergences between the posteriors at different levels of latent variable hierarchy 204 and the corresponding priors (e.g., as represented by prior 252). Each KL(q($z_l$|x, $z_{<l}$)||p($z_l$|$z_{<l}$)) can be considered the amount of information encoded in the lth group. The reparametrization trick may be used to backpropagate with respect to parameters of encoder 202 through objective function 220.

To mitigate posterior collapse in groups of latent variables in latent variable hierarchy 204, KL balancing coefficients denoted by $y_l$ may be added to objective function 220:

$$KL(q(z \mid x) \parallel p(z)) = \sum_{l=1}^{L} \gamma_l \mathbb{E}_{q(z_{<l}|x)}[KL(q(z_l \mid x, z_{<l}) \parallel p(z_l \mid z_{<l}))].$$

A given balancing coefficient $y_l$ may be set to a small value when the KL term for the corresponding group is small to encourage VAE 200 to use latent variables in the group. Conversely, the balancing coefficient may be set to a large value when the KL term for the corresponding group is large to reduce the use of latent variables in the group. To account for latent variable groups of different spatial dimensions, the balancing coefficient may additionally be proportional to the size $s_l$ of the corresponding group:

$$\gamma_l \propto s_l \mathbb{E}_{x \sim \mathcal{M}}\left(\mathbb{E}_{q(z_{<l}|x)}[KL(q(z_l \mid x, z_{<l}) \| p(z_l \mid z_{<l}))]\right).$$

The balancing coefficients may additionally be applied during a "warm-up period" during training of VAE 200 (e.g., the first 30% of training) and set to 1 afterwards to optimize the variational bound represented by objective function 220.

In one or more embodiments, update component 212 includes a spectral regularization 232 term in objective function 220 to stabilize training of VAE 200. More specifically, the KL terms in objective function 220 can become unbounded and cause sharp gradient updates that destabilize training of encoder 202, prior 252, and/or decoder 204. To bound the KL terms, update component 212 may use spectral regularization 232 that minimizes the Lipschitz constant for each layer of VAE 200. For example, spectral regularization 232 may be performed by adding the term $\mathcal{L}_{SR}=\lambda\Sigma_i s^{(i)}$ to Equation 1, where $s^{(i)}$ is the largest singular value of the ith conventional layer (e.g., as estimated using a single power iteration update), and λ is a coefficient that controls the smoothness of the output of encoder 202, prior 252, and/or decoder 206.

Consequently, selection of a suitable λ with spectral regularization 232 may reduce training instability caused by the KL terms in objective function 220 by ensuring that the output of encoder 202, prior 252, and/or decoder 206 does not change dramatically as the corresponding input changes. For example, the setting of λ to 1.0 allows the KL term to gradually decrease and stabilize over tens of thousands of training iterations, while the omission of spectral regularization 232 and/or the setting of λ to a smaller value (e.g., 0.1) causes the KL term to become unbounded after a certain number of training iterations.

Update component 212 also, or instead, reduces instability associated with the KL terms in objective function 220 using a residual Normal distribution that parameterizes q(z|x) relative to p(z). In particular, the ith variable in $z_l$ in the prior may be represented using the following Normal distribution:

$$p(z_l^i \mid z_{<l}) := \mathcal{N}(\mu_i(z_{<l}), \sigma_i(z_{<l}))$$

In turn, the posterior may be represented using the following:

$$q(z_l^i \mid z_{<l}, x) := \mathcal{N}(\mu_i(z_{<l}) + \Delta\mu_i(z_{<l}, x), \sigma_i(z_{<l}) \cdot \Delta\sigma_i(z_{<l}, x)),$$

where $\Delta\mu_i(z_{<l}, x)$ and Ao; (Z<1, x) are the relative location and scale of the approximate posterior with respect to the prior.

In this parameterization, when the prior moves, the approximate posterior moves accordingly, so that encoder 202 learns the posterior as a Normal distribution representing a relative change with respect to prior 252. In turn, the KL term in objective function 220 becomes:

$$KL(q(z^i \mid x) \parallel p(z^i)) = \frac{1}{2}\left(\frac{\Delta\mu_i^2}{\sigma_i^2} + \Delta\sigma_i^2 - \log \Delta\sigma_i^2 - 1\right), \quad (2)$$

where the subscript l and associated dependencies are dropped for ease of notation. In the above equation, if $\sigma_i$ generated by decoder 206 is bounded from below, the KL term primarily depends on the relative parameters generated by encoder 202 and can be minimized more easily than when q($z_l$|$z_{<l}$, x) predicts the absolute location and scale of the posterior. For example, the use of a residual Normal distribution in q(z|x) of a VAE with 40 latent variable groups in latent variable hierarchy 204 improves the KL term by 0.04 bits per dimension (bpd) during training and the test log-likelihood by 0.03 bpd.

Update component 212 also, or instead, applies batch normalization 222 to at least some layers of VAE 200 during training of encoder 202, prior 252, and/or decoder 206. In some embodiments, batch normalization 222 is performed using one or more batch normalization layers in VAE 200. Each batch normalization layer normalizes a "batch" of outputs from the previous activation layer to have a normalized mean (e.g., 0) and variance (e.g., 1) by shifting each of the outputs by the mean and standard deviation of the batch. To prevent instability associated with conventional batch normalization of VAEs, update component 212 performs scaling regularization 234 that applies a regularization on a norm (e.g., L1 norm, L2 norm, L-infinity norm, etc.) of scaling parameters in batch normalization layers of encoder 202, prior 252, and/or decoder 206. As described in further detail below with respect to FIGS. 4A and 4B, batch normalization may be combined with a Swish activation function to further improve the performance of VAE 200.

Training engine 122 also includes a memory management component 214 that improves memory consumption during training of VAE 200. First, memory management component 214 may store parameters of encoder 202, prior 252, and decoder 206 using mixed precision 226. For example, memory management component 214 may selectively store certain types of parameters or operations (e.g., convolution, matrix multiplication, etc.) in VAE 200 as half-precision (e.g., 16-bit) floating-point numbers and the remaining parameters or operations in VAE 200 as single-precision (e.g., 32-bit) floating-point numbers.

Second, memory management component 214 may perform gradient checkpointing 228 that selectively stores a first subset of activations generated by VAE 200 from training data 208 during a forward pass performed during training of VAE 200 and uses the stored activations to recalculate a second subset of activations generated by VAE 200 during a corresponding backward pass performed during training of VAE 200. For example, memory management component 214 may fuse the batch normalization and Swish activation function of certain layers in VAE 200 and store a single copy of the feature map produced by the fused operations during a forward pass. The batch normalization is then recomputed during the corresponding backward pass (e.g., using activations that are selectively stored for convolutional or other layers of VAE 200) to calculate gradients of objective function 220 with respect to the batch normalization layers and update weights of VAE 200 accordingly. Such gradient checkpointing 228 may reduce memory consumption (e.g., by 18%) during training of VAE 200, which in turn allows the training throughput to be increased via a larger batch size (e.g., from 34 images a second to 64 images a second).

After training of VAE 200 is complete, execution engine 124 executes one or more portions of VAE 200 to produce generative output 250 that is not found in the set of training data 208. In particular, execution engine 124 obtains latent variable samples 236 from the distribution of latent variables in latent variable hierarchy 204 learned by prior 252. Execution engine 124 uses latent variable samples 236 to generate a data distribution 238 as output of decoder 206 and subsequently samples from data distribution 238 to produce generative output 250.

For example, execution engine 124 may obtain a set of latent variable samples 236 as values of latent variables in latent variable hierarchy 204 that are sampled from the distribution described by parameters (e.g., means and variances) outputted by prior 252, after VAE 200 is trained on training data 208 that includes images of human faces. Execution engine 124 may apply decoder 206 to latent variable samples 236, and decoder 206 may output parameters of data distribution 238 corresponding to the likelihood p(x|z) (e.g., the distribution of pixel values for individual pixels in an image, given latent variable samples 236). Execution engine 124 may then sample from the likelihood parameterized by decoder 206 to produce generative output 250 that includes an image of a human face. Because latent variable samples 236 are obtained from a continuous latent space representation outputted by encoder 202, execution engine 124 may interpolate between visual attributes represented by the latent variables (e.g., generating smooth transitions between angry and happy facial expressions represented by one or more latent variables) to generate images of human faces that are not found in training data 208.

In one or more embodiments, execution engine 124 uses a momentum parameter 216 to calculate batch statistics 218 that are used in batch normalization 224 during the creation of generative output 250. More specifically, execution engine 124 may select a value of momentum parameter 216 that increases the rate at which exponential moving averages and/or other running statistics associated with batch normalization 224 catch up to batch statistics 218, which improves the diversity and/or quality of generative output 250.

Execution engine 124 may additionally perform batch normalization 224 associated with producing generative output 250 in a number of ways. For example, execution engine 124 may discard batch statistics used to train VAE 200 and recalculate batch statistics 218 for a batch of samples of generative output 250. When a single sample of generative output 250 is to be generated, execution engine 124 may calculate batch statistics 218 for a batch of generative output 250 and use the calculated batch statistics 218 to produce a final sample of generative output 250.

Figure 3B:
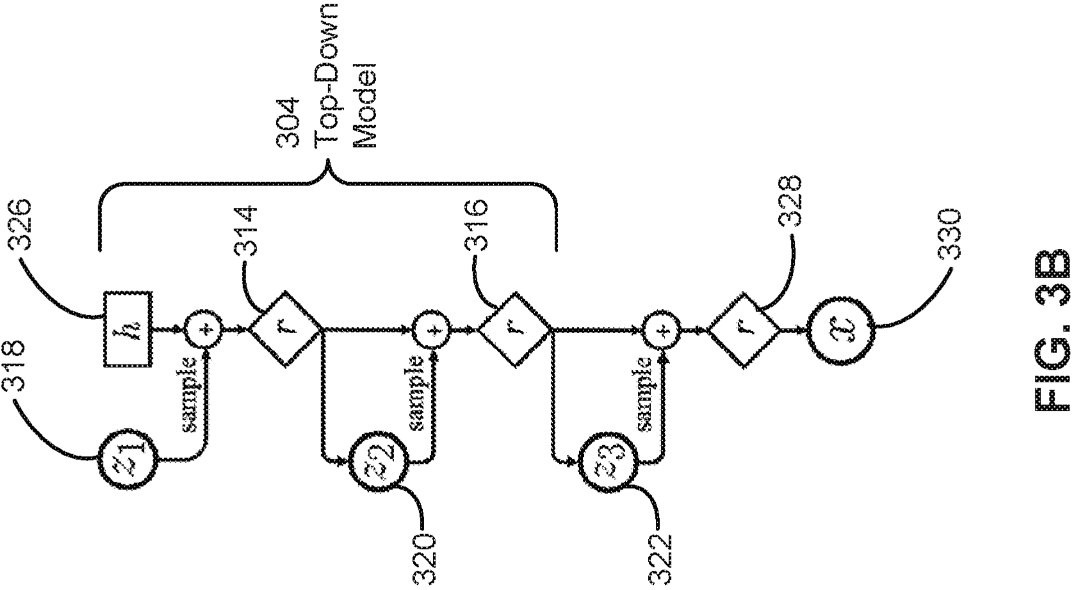
FIG. 3B is an example architecture for a generative model in the VAE of FIG. 2, according to various embodiments.
Figure 3A:
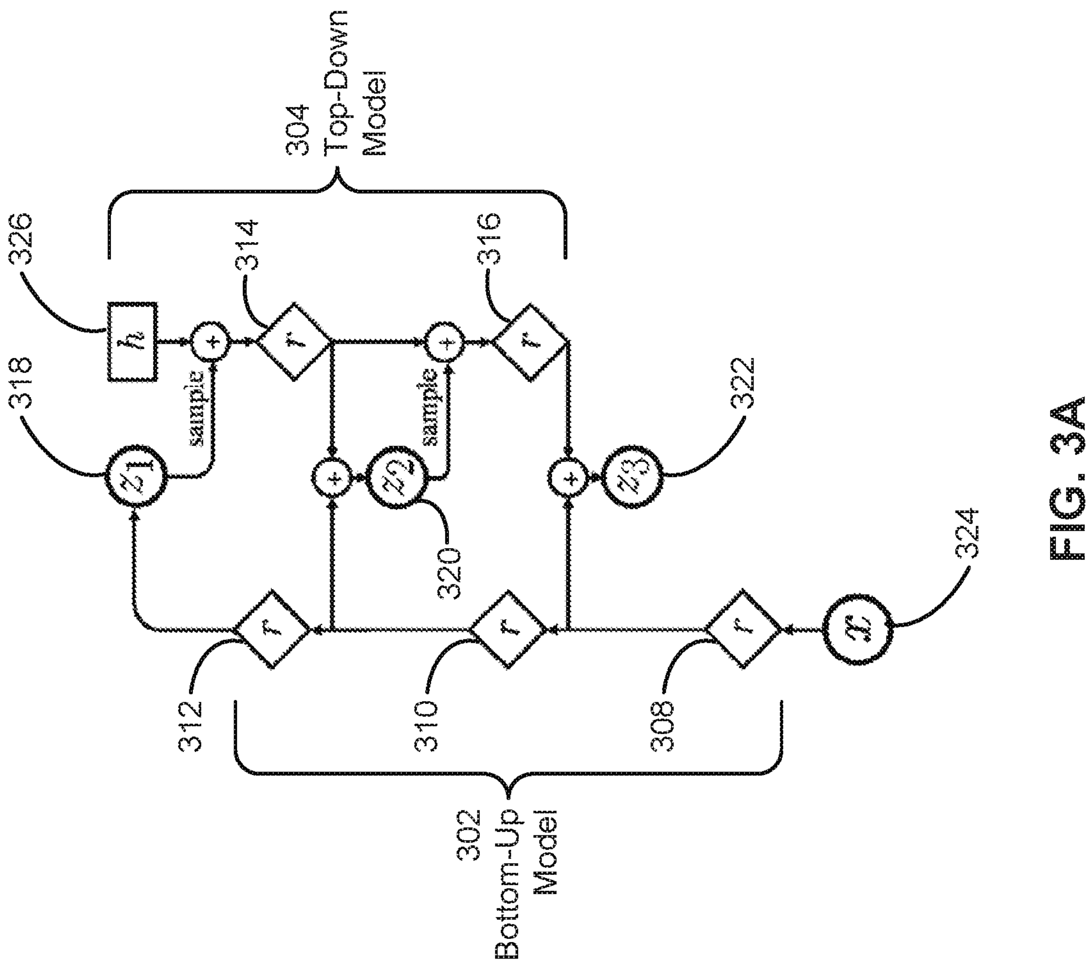
FIG. 3A is an example architecture for the encoder of FIG. 2, according to various embodiments.

FIG. 3A is an example architecture for encoder 202 of FIG. 2, according to various embodiments. As shown, the example architecture forms a bidirectional inference model that includes a bottom-up model 302 and a top-down model 302.

Bottom-up model 302 includes a number of residual networks 308-312, and top-down model 304 includes a number of additional residual networks 314-316 and a trainable parameter 326. Each of residual networks 308-316 includes one or more residual cells, which are described in further detail below with respect to FIGS. 4A and 4B.

Residual networks 308-312 in bottom-up model 302 deterministically extract features from an input 324 (e.g., an image) to infer the latent variables in the approximate posterior (e.g., q(z|x) in the probability model for VAE 200). In turn, components of top-down model 304 are used to generate the parameters of each conditional distribution in latent variable hierarchy 204. After latent variables are sampled from a given group in latent variable hierarchy 204, the samples are combined with feature maps from bottom-up model 302 and passed as input to the next group.

More specifically, a given data input 324 is sequentially processed by residual networks 308, 310, and 312 in bottom-up model 302. Residual network 308 generates a first feature map from input 324, residual network 310 generates a second feature map from the first feature map, and residual network 312 generates a third feature map from the second feature map. The third feature map is used to generate the parameters of a first group 318 of latent variables in latent variable hierarchy 204, and a sample is taken from group 318 and combined (e.g., summed) with parameter 326 to produce input to residual network 314 in top-down model 304. The output of residual network 314 in top-down model 304 is combined with the feature map produced by residual network 310 in bottom-up model 302 and used to generate the parameters of a second group 320 of latent variables in latent variable hierarchy 204. A sample is taken from group 320 and combined with output of residual network 314 to generate input into residual network 316. Finally, the output of residual network 316 in top-down model 304 is combined with the output of residual network 308 in bottom-up model 302 to generate parameters of a third group 322 of latent variables, and a sample may be taken from group 322 to produce a full set of latent variables representing input 324.

While the example architecture of FIG. 3A is illustrated with a latent variable hierarchy of three latent variable groups, those skilled in the art will appreciate that encoder 202 may utilize a different number of latent variable groups in the hierarchy, different numbers of latent variables in each group of the hierarchy, and/or varying numbers of residual cells in residual networks. For example, latent variable hierarchy 204 for an encoder that is trained using 28×28 pixel images of handwritten characters may include 15 groups of latent variables at two different "scales" (i.e., spatial dimensions) and one residual cell per group of latent variables. The first five groups have 4×4×20-dimensional latent variables (in the form of height×width×channel), and the next ten groups have 8×8×20-dimensional latent variables. In another example, latent variable hierarchy 204 for an encoder that is trained using 256×256 pixel images of human faces may include 36 groups of latent variables at five different scales and two residual cells per group of latent variables. The scales include spatial dimensions of 8×8×20, 16×16×20, 32×32×20, 64×64×20, and 128×128×20 and 4, 4, 4, 8, and 16 groups, respectively.

FIG. 3B is an example architecture for a generative model in VAE 200 of FIG. 2, according to various embodiments. As shown, the generative model includes top-down model 304 from the example encoder architecture of FIG. 3A, as well as an additional residual network 328 that implements decoder 206.

In the example generative model architecture of FIG. 3B, the representation extracted by residual networks 314-316 of top-down model 304 is used to infer groups 318-322 of latent variables in the hierarchy. A sample from the last group 322 of latent variables is then combined with the output of residual network 316 and provided as input to residual network 328. In turn, residual network 328 generates a data output 330 that is a reconstruction of a corresponding input 324 into the encoder and/or a new data point sampled from the distribution of training data for VAE 200.

In some embodiments, top-down model 304 is used to learn a prior (e.g., prior 252 of FIG. 2) distribution of latent variables 318-322 during training of VAE 200. The prior is then reused in the generative model to sample from groups 318-322 of latent variables before some or all of the samples are converted by decoder 206 into generative output. This sharing of top-down model 304 between encoder 202 and the generative model reduces computational and/or resource overhead associated with learning a separate top-down model for prior 252 and using the separate top-down model in the generative model. Alternatively, VAE 200 may be structured so that encoder 202 uses a first top-down model to generate latent representations of training data 208 and the generative model uses a second, separate top-down model as prior 252.

Figure 4A:
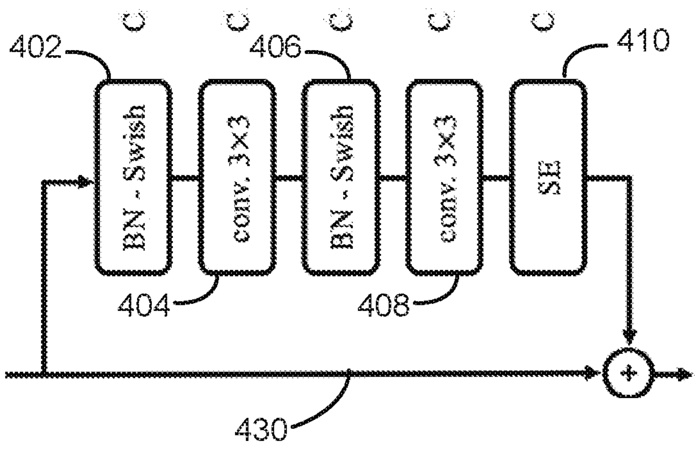
FIG. 4A is an example residual cell in the encoder of FIG. 2, according to various embodiments.

FIG. 4A is an example residual cell in encoder 202 of FIG. 2, according to various embodiments. More specifically, FIG. 4A shows a residual cell that is used by one or more residual networks 308-312 in bottom-up model 302 of FIG. 3A. As shown, the residual cell includes a number of blocks 402-410 and a residual link 430 that adds the input into the residual cell to the output of the residual cell.

Block 402 is a batch normalization block with a Swish activation function, block 404 is a 3×3 convolutional block, block 406 is a batch normalization block with a Swish activation function, block 408 is a 3×3 convolutional block, and block 410 is a squeeze and excitation block that performs channel-wise gating in the residual cell. In addition, the same number of channels is maintained across blocks 402-410. Unlike conventional residual cells with a convolution-batch normalization-activation ordering, the residual cell of FIG. 4A includes a batch normalization-activation-convolution ordering, which may improve the performance of bottom-up model 302 and/or encoder 202.

Figure 4B:
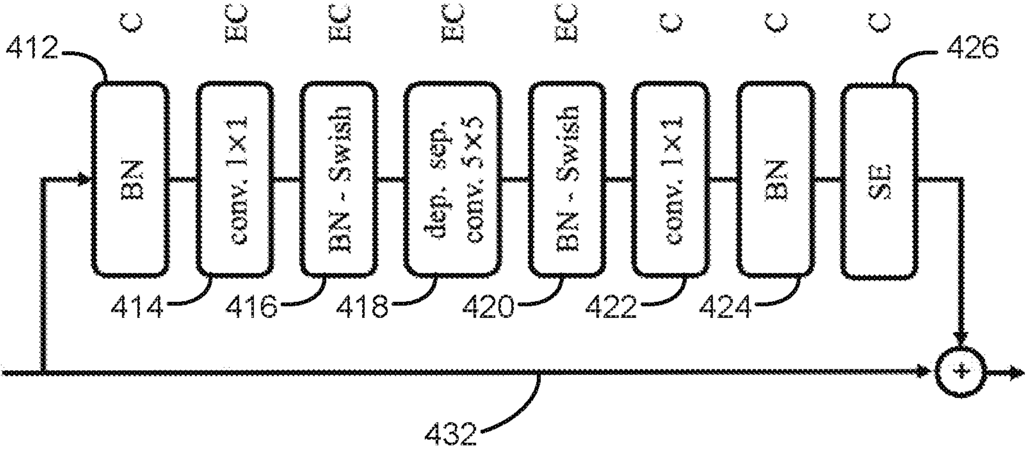
FIG. 4B is an example residual cell in the generative model of VAE 200 of FIG. 2, according to various embodiments.

FIG. 4B is an example residual cell in the generative model of VAE 200 of FIG. 2, according to various embodiments. More specifically, FIG. 4B shows a residual cell that is used by one or more residual networks 314-316 in top-down model 304 of FIGS. 3A and 3B. As shown, the residual cell includes a number of blocks 412-426 and a residual link 432 that adds the input into the residual cell to the output of the residual cell.

Block 412 is a batch normalization block, block 414 is a 1×1 convolutional block, block 416 is a batch normalization block with a Swish activation function, block 418 is a 5×5 depthwise separable convolutional block, block 420 is a batch normalization block with a Swish activation function, block 422 is a 1×1 convolutional block, block 424 is a batch normalization block, and block 426 is a squeeze and excitation block. Blocks 414-420 marked with "EC" indicate that the number of channels is expanded "E" times, while blocks marked with "C" include the original "C" number of channels. In particular, block 414 performs a 1×1 convolution that expands the number of channels to improve the expressivity of the depthwise separable convolutions performed by block 418, and block 422 performs a 1×1 convolution that maps back to "C" channels. At the same time, the depthwise separable convolution reduces parameter size and computational complexity over regular convolutions with increased kernel sizes without negatively impacting the performance of the generative model.

Moreover, the use of batch normalization with a Swish activation function in the residual cells of FIGS. 4A and 4B may improve the training of encoder 202 and/or decoder 206 over conventional residual cells or networks. For example, the combination of batch normalization and the Swish activation in the residual cell of FIG. 4A improves the performance of a VAE with 40 latent variable groups by about 5% over the use of weight normalization and an exponential linear unit activation in the same residual cell.

Figure 5:
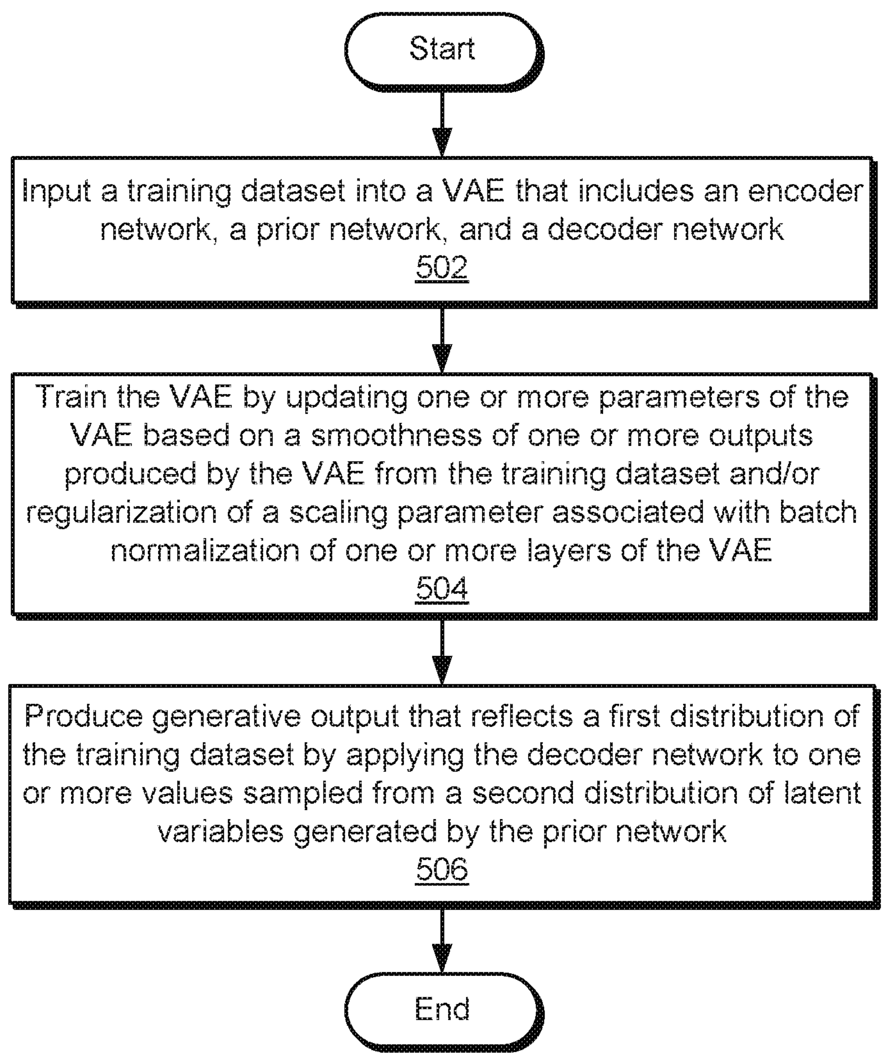
FIG. 5 is a flow chart of method steps for performing machine learning, according to various embodiments.

FIG. 5 is a flow chart of method steps for performing machine learning, according to various embodiments. Although the method steps are described in conjunction with the systems of FIGS. 1 and 2, persons skilled in the art will understand that any system configured to perform the method steps in any order falls within the scope of the present disclosure.

As shown, training engine 122 inputs 502 a training dataset into a VAE that includes an encoder network, a prior network, and a decoder network. For example, training engine 122 may input a set of training images that have been scaled to a certain resolution into a hierarchical VAE. The training images may include human faces, animals, vehicles, and/or other types of objects.

Next, training engine 122 trains 504 the VAE by updating one or more parameters of the VAE based on a smoothness of one or more outputs produced by the VAE from the training dataset and/or regularization of a scaling parameter associated with batch normalization of one or more layers of the VAE. For example, training engine 122 may include a spectral regularization parameter in the objective function used to train the encoder, prior, and/or decoder networks. The spectral regularization parameter includes a coefficient that controls the smoothness of the output of the encoder, prior, and/or decoder networks. The spectral regularization parameter and/or coefficient may thus reduce training instability caused by one or more KL terms in the objective function by ensuring that the output of the encoder and/or decoder networks does not change dramatically as the corresponding input changes.

In another example, training engine 122 may add a regularization term to the scaling parameter used to perform batch normalization in one or more layers of the encoder, prior, and/or decoder networks. The regularization term may include, but is not limited to, an L1 norm, L2 norm, and/or L-infinity norm. In turn, the regularization term may stabilize training of the VAE with respect to the batch normalization layer(s).

Training engine 122 may use a number of techniques to reduce the memory overhead associated with training the VAE. For example, training engine 122 may store a first subset of activations generated by the VAE from the training dataset during a forward pass associated with training the VAE and recalculate a second subset of activations generated by the VAE based on the stored first subset of activations during a backward pass associated with training the VAE. This selective storing and recalculation of activations may reduce memory consumption over conventional techniques that store all activations during training of neural networks. In another example, training engine 122 may store a first portion of parameters in the VAE using a first precision (e.g., single precision float) and a second portion of parameters in the VAE using a second precision that is lower than the first precision (e.g., half precision float).

Execution engine 124 then produces 506 generative output that reflects a first distribution of the training dataset by applying the decoder network to one or more values sampled from a second distribution of latent variables generated by the prior network. For example, execution engine 124 may sample latent variable values from a distribution learned by top-down model 304 of FIG. 3A. The latent variables may be arranged into a sequential hierarchy of disjoint groups; within the hierarchy, a first sample from a first group is combined with a feature map and passed to a second group following the first group for use in generating parameters of the distribution (and a second sample) for the second group.

After the latent variables are sampled using the hierarchy, execution engine 124 may input one or more of the sampled latent variable values into the decoder network, and the decoder network may update the likelihood function for the distribution of the training data based on the sampled latent variable value(s). The generative output may then be produced by sampling values (e.g., pixel values in an image) from the likelihood function.

Figure 6:
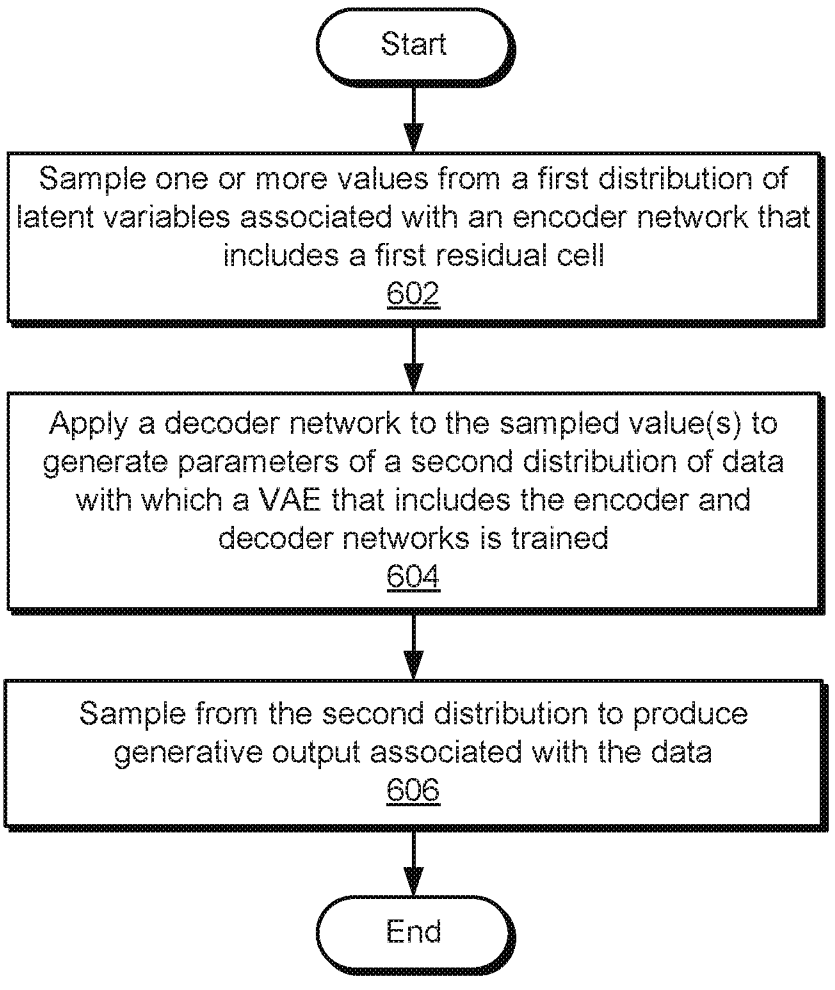
FIG. 6 is a flow chart of method steps for producing generative output, according to various embodiments.

FIG. 6 is a flow chart of method steps for producing generative output, according to various embodiments. Although the method steps are described in conjunction with the systems of FIGS. 1 and 2, persons skilled in the art will understand that any system configured to perform the method steps in any order falls within the scope of the present disclosure.

As shown, execution engine 124 samples 602 one or more values from a first distribution of latent variables associated with an encoder network that includes a first residual cell. Next, execution engine 124 applies 604 a decoder network that includes a second residual cell to the sampled value(s) to generate parameters of a second distribution of data with which a VAE that includes the encoder and decoder networks is trained.

For example, the encoder network may be a bidirectional encoder with a top-down model and a bottom-up model that perform bidirectional inference of a hierarchy of groups of latent variables. The first residual cell may be used in the bottom-up model and include a first batch-normalization layer with a first Swish activation function, a first convolutional layer following the first batch normalization layer with the first Swish activation function, a second batch normalization layer with a second Swish activation function, a second convolutional layer following the second batch normalization layer with the second Swish activation function, and a first squeeze and excitation layer following the second convolutional layer. After the encoder network is trained, the latent variable values may be sampled using the top-down model and inputted into the decoder. In turn, the decoder network outputs parameters of a likelihood function for the second distribution, given the inputted latent variable values.

Finally, execution engine 124 samples 606 from the second distribution to produce generative output associated with the data. Continuing with the above example, execution engine 124 may obtain samples from the likelihood function outputted by the decoder network to produce the generative output (e.g., as pixel values of pixels in an image).

Example Game Streaming System

Figure 7:
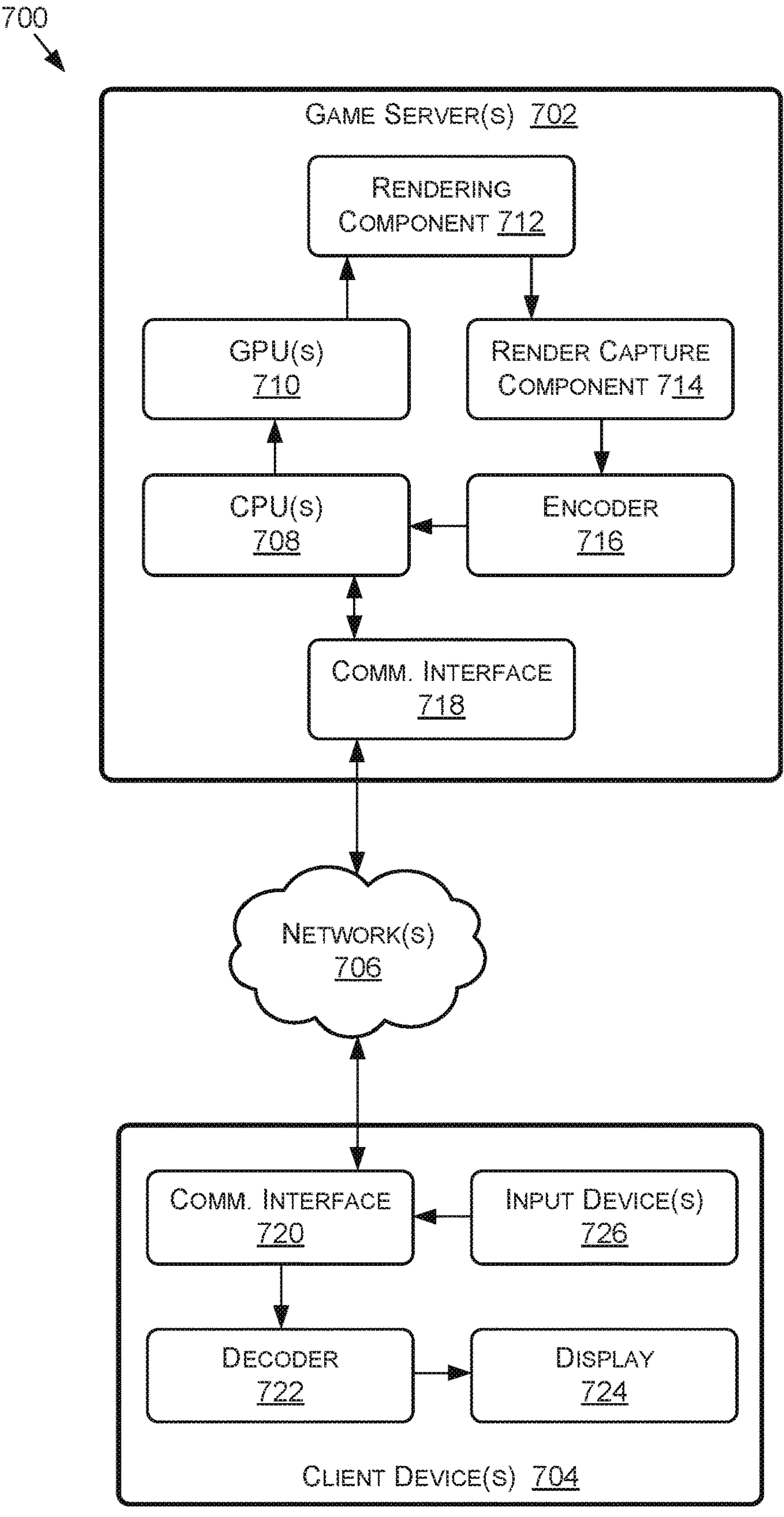
FIG. 7 is an example system diagram for a game streaming system, according to various embodiments.

FIG. 7 is an example system diagram for a game streaming system 700, according to various embodiments. FIG. 7 includes game server(s) 702 (which may include similar components, features, and/or functionality to the example computing device 100 of FIG. 1), client device(s) 704 (which may include similar components, features, and/or functionality to the example computing device 100 of FIG. 1), and network(s) 706 (which may be similar to the network(s) described herein). In some embodiments, system 700 may be implemented using a cloud computing system and/or distributed system.

In system 700, for a game session, client device(s) 704 may only receive input data in response to inputs to the input device(s), transmit the input data to game server(s) 702, receive encoded display data from game server(s) 702, and display the display data on display 724. As such, the more computationally intense computing and processing is offloaded to game server(s) 702 (e.g., rendering—in particular ray or path tracing—for graphical output of the game session is executed by the GPU(s) of game server(s) 702). In other words, the game session is streamed to client device(s) 704 from game server(s) 702, thereby reducing the requirements of client device(s) 704 for graphics processing and rendering.

For example, with respect to an instantiation of a game session, a client device 704 may be displaying a frame of the game session on the display 724 based on receiving the display data from game server(s) 702. Client device 704 may receive an input to one of the input device(s) and generate input data in response. Client device 704 may transmit the input data to the game server(s) 702 via communication interface 720 and over network(s) 706 (e.g., the Internet), and game server(s) 702 may receive the input data via communication interface 718. The CPU(s) may receive the input data, process the input data, and transmit data to the GPU(s) that causes the GPU(s) to generate a rendering of the game session. For example, the input data may be representative of a movement of a character of the user in a game, firing a weapon, reloading, passing a ball, turning a vehicle, etc. Rendering component 712 may render the game session (e.g., representative of the result of the input data), and render capture component 714 may capture the rendering of the game session as display data (e.g., as image data capturing the rendered frame of the game session). The rendering of the game session may include ray- or path-traced lighting and/or shadow effects, computed using one or more parallel processing units—such as GPUs, which may further employ the use of one or more dedicated hardware accelerators or processing cores to perform ray or path-tracing techniques—of game server(s) 702. Encoder 716 may then encode the display data to generate encoded display data and the encoded display data may be transmitted to client device 704 over network(s) 706 via communication interface 718. Client device 704 may receive the encoded display data via communication interface 720, and decoder 722 may decode the encoded display data to generate the display data. Client device 704 may then display the display data via display 724.

In some embodiments, system 700 includes functionality to implement training engine 122 and/or execution engine 124 of FIGS. 1-2. For example, one or more components of game server 702 and/or client device(s) 704 may execute training engine 122 to input a training dataset (e.g., a set of images or models of characters or objects in a game) into a VAE and/or another machine learning model that includes an encoder network, a prior network, and a decoder network. The executed training engine 122 may also train the VAE by updating parameters of the VAE based on a smoothness of one or more outputs produced by the VAE from the training dataset. One or more components of game server 702 and/or client device(s) 704 may then execute inference engine 124 to produce generative output that reflects a first distribution of the training dataset (e.g., additional images or models of characters or objects that are not found in the training dataset) by applying the decoder network to one or more values sampled from a second distribution of latent variables generated by the prior network. The generative output may then be shown in display 724 during one or more game sessions on client device(s) 704.

In sum, the disclosed embodiments train a hierarchical VAE and execute one or more portions of the VAE to produce generative output. The hierarchical VAE includes an encoder and a prior that learn a latent representation of a training dataset, such as a set of images of human faces, animals, vehicles, and/or other types of objects. The hierarchical VAE also includes a decoder that outputs parameters to a distribution of data in the training dataset, given latent variables sampled from the latent representation. The latent representation is organized into a hierarchy of disjoint groups of latent variables, where a sample from a given group in the hierarchy is provided as input that is used to generate a distribution from which the next group in the hierarchy is sampled. The performance of the VAE is improved by training the VAE using an objective function that includes a spectral regularization term and/or by using batch normalization with batch statistics that are readjusted during sampling of new data points using one or more portions of the trained VAE. The memory overhead associated with training the VAE may be reduced by performing gradient checkpointing and/or storing parameters' of the VAE using mixed precision.

Such memory-efficient training of the VA improves resource overhead and training throughput, thereby improving the operation of computer systems involved in training the VAE. Techniques for stabilizing the training of the VAE and/or using the VAE with batch normalization additionally improve the convergence and/or performance of the VAE over conventional techniques for training and executing VAEs. Thus, by reducing resource consumption and/or improving performance associated with training and/or executing the VAE, the disclosed techniques provide technological improvements in computer systems, applications, frameworks, and/or techniques for training and executing generative models, generating content, augmenting data, rendering computer graphics, and/or performing representation or feature learning.

1. In some embodiments, a method for performing machine learning comprises inputting a set of training images into a machine learning model comprising an encoder portion, a prior portion, and a decoder portion; training the machine learning model by updating one or more parameters of the machine learning model based on a smoothness of one or more outputs produced by the machine learning model when processing the training dataset; and producing a new image that reflects one or more visual attributes associated with the set of training images by applying the decoder portion to a value generated based on an output of the prior portion.
2. The method of clause 1, wherein the new image comprises a face that is not found in the set of training images.
3. The method of any of clauses 1-2, wherein the new image comprises an animal or a vehicle that is not found in the set of training images.
4. In some embodiments, a method for performing machine learning comprises inputting a training dataset into a variational autoencoder (VAE) comprising an encoder network, a prior network, and a decoder network; training the VAE by updating one or more parameters of the VAE based on a smoothness of one or more outputs produced by the VAE from the training dataset; and producing generative output that reflects a first distribution of the training dataset by applying the decoder network to one or more values sampled from a second distribution of latent variables generated by the prior network.
5. The method of clause 4, wherein applying the decoder network to the one or more values comprises applying batch normalization to one or more layers of the decoder network based on a momentum parameter that increases a rate at which a running statistic associated with the batch normalization catches up to a batch statistic associated with the batch normalization.
6. The method of any of clauses 4-5, wherein training the VAE comprises applying a regularization parameter to a scaling parameter associated with the batch normalization.
7. The method of any of clauses 4-6, wherein applying the batch normalization to the one or more layers comprises combining the batch normalization with a Swish activation function.
8. The method of any of clauses 4-7, wherein applying the batch normalization to the one or more layers of the decoder network comprises recalculating batch statistics associated with the batch normalization based on the one or more values sampled from the second distribution.
9. The method of any of clauses 4-8, wherein the VAE comprises a hierarchy of groups of the latent variables, and wherein a first sample from a first group in the hierarchy is combined with a feature map and passed to a second group following the first group in the hierarchy for use in generating a second sample from the second group.
10. The method of any of clauses 4-9, wherein the VAE comprises a residual cell and the residual cell comprises a first batch-normalization (BN) layer with a first Swish activation function, a first convolutional layer following the first BN layer with the first Swish activation function, a second BN layer with a second Swish activation function, a second convolutional layer following the second BN layer with the second Swish activation function, and a squeeze and excitation (SE) layer.
11. The method of any of clauses 4-10, wherein the VAE comprises a residual cell and the residual cell comprises comprise a first BN layer, a first convolutional layer following the first BN layer, a second BN layer with a first Swish activation function, and a depthwise separable convolution layer following the second BN layer.

12. The method of any of clauses 4-11, wherein the residual cell further comprises a third BN layer with a second Swish activation function, a second convolutional layer following the third BN layer, a fourth BN layer following the second convolutional layer, and an SE layer following the fourth BN layer.

13. The method of any of clauses 4-12, wherein training the VAE comprises updating the one or more parameters of the VAE based on an objective function comprising a spectral regularization term that controls the smoothness of one or more outputs produced by the VAE from the training dataset.

14. The method of any of clauses 4-13, wherein training the VAE comprises storing a first subset of activations generated by the VAE from the training dataset during a forward pass associated with training the VAE; and recalculating a second subset of activations generated by the VAE based on the stored first subset of activations during a backward pass associated with training the VAE to reduce a memory consumption associated with training of the VAE.

15. The method of any of clauses 4-14, wherein training the VAE comprises storing a first portion of the one or more parameters using a first precision and storing a second portion of the one or more parameters using a second precision that is lower than the first precision.

16. In some embodiments, a non-transitory computer readable medium stores instructions that, when executed by a processor, cause the processor to perform the steps of inputting a training dataset into a variational autoencoder (VAE) comprising an encoder network, a prior network, and a decoder network; training the VAE by updating one or more parameters of the VAE based on regularization of a scaling parameter associated with batch normalization of one or more layers of the VAE; and producing generative output that reflects a first distribution of the training dataset by applying the decoder network to one or more values sampled from a second distribution of latent variables generated by the prior network.

17. The non-transitory computer readable medium of clause 16, wherein training the VAE further comprises updating the one or more parameters of the VAE based on an objective function comprising a spectral regularization term that controls a smoothness of one or more outputs produced by the VAE from the training dataset.

18. The non-transitory computer readable medium of any of clauses 16-17, wherein applying the decoder network to the one or more values comprises applying the batch normalization to the one or more layers based on a momentum parameter that increases a rate at which a running statistic associated with the batch normalization catches up to a batch statistic associated with the batch normalization.

19. The non-transitory computer readable medium of any of clauses 16-18, wherein the VAE comprises a hierarchy of groups of the latent variables, and wherein a first sample from a first group in the hierarchy is combined with a feature map and passed to a second group following the first group in the hierarchy for use in generating a second sample from the second group.

20. The non-transitory computer readable medium of any of clauses 16-19, wherein the encoder network comprises a bottom-up model and a top-down model that perform bidirectional inference of the groups of the latent variables based on the training dataset.

21. The non-transitory computer readable medium of any of clauses 16-20, wherein producing the generative output comprises executing the top-down model to sample the one or more values along the hierarchy of groups of the latent variables; and inputting the sampled one or more values into the decoder network to produce the generative output.

22. The non-transitory computer readable medium of any of clauses 16-21, wherein applying the decoder network to the one or more values comprises recalculating batch statistics associated with the batch normalization based on the one or more values sampled from the second distribution.

23. In some embodiments, a system comprises a memory that stores instructions, and a processor that is coupled to the memory and, when executing the instructions, is configured to sample one or more values from a first distribution of latent variables associated with an encoder network comprising a first residual cell, wherein the first residual cell comprises a first batch-normalization (BN) layer with a first Swish activation function, a first convolutional layer following the first BN layer with the first Swish activation function, a second BN layer with a second Swish activation function, a second convolutional layer following the second BN layer with the second Swish activation function, and a first squeeze and excitation (SE) layer following the second convolutional layer; apply a decoder network to the one or more values to generate parameters of a second distribution of data with which a variational autoencoder (VAE) comprising the encoder network and the decoder network is trained; and sample from the second distribution to produce generative output associated with the data.

24. The system of clause 23, wherein the one or more values are sampled using a second residual cell comprising a third BN layer, a third convolutional layer following the third BN layer, a fourth BN layer with a third Swish activation function, and a depthwise separable convolution layer following the fourth BN layer.

25. The system of any of clauses 23-24, wherein the second residual cell further comprises a fifth BN layer with a fourth Swish activation function, a fourth convolutional layer following the fifth BN layer, a sixth BN layer following the fourth convolutional layer, and a second SE layer following the sixth BN layer.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a “module,” a “system,” or a “computer.” In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method for performing machine learning, comprising:

inputting a set of training images into a machine learning model that comprises an encoder portion, a prior, and a decoder portion;

training the machine learning model by updating one or more parameters of the machine learning model based on an objective function, the objective function controlling a smoothness of one or more outputs produced by the machine learning model when processing the set of training images, wherein training the machine learning model comprises:

applying, to the objective function, a plurality of balancing coefficients to generate a modified objective function, the plurality of balancing coefficients including a first balancing coefficient that has a first value during a first training period and a second balancing coefficient that has a second value, wherein the second value is higher than the first value during a second training period that occurs after the first training period, and updating the one or more parameters of the machine learning model based on the modified objective function; and producing a new image that reflects one or more visual attributes associated with the set of training images by applying the decoder portion to a value generated based on an output of the prior.

2. The method of claim 1, wherein the new image comprises a face that is not found in the set of training images.

3. The method of claim 1, wherein the new image comprises an animal or a vehicle that is not found in the set of training images.

4. A method for performing machine learning, comprising:

inputting a training dataset into a variational autoencoder (VAE) comprising an encoder network, a prior network, and a decoder network;

training the VAE by updating one or more parameters of the VAE based on an objective function, the objective function controlling a smoothness of one or more outputs produced by the VAE when processing the training dataset, wherein training the VAE comprises:

applying, to the objective function, a plurality of balancing coefficients to generate a modified objective function, the plurality of balancing coefficients including a first balancing coefficient that has a first value during a first training period and a second balancing coefficient that has a second value, wherein the second value is higher than the first value during a second training period that occurs after the first training period, and updating the one or more parameters of the VAE based on the objective function; and producing generative output that reflects a first distribution of the training dataset by applying the decoder network to one or more values sampled from a second distribution of latent variables generated by the prior network.

5. The method of claim 4, wherein applying the decoder network to the one or more values comprises applying batch normalization to one or more layers of the decoder network based on a momentum parameter that increases a rate at which a running statistic associated with the batch normalization catches up to a batch statistic associated with the batch normalization.

6. The method of claim 5, wherein training the VAE comprises applying a regularization parameter to a scaling parameter associated with the batch normalization.

7. The method of claim 5, wherein applying the batch normalization to the one or more layers comprises combining the batch normalization with a Swish activation function.

8. The method of claim 5, wherein applying the batch normalization to the one or more layers of the decoder network comprises recalculating batch statistics associated with the batch normalization based on the one or more values sampled from the second distribution.

9. The method of claim 4, wherein the VAE comprises a hierarchy of groups of the latent variables, and wherein a first sample from a first group in the hierarchy is combined with a feature map and passed to a second group following the first group in the hierarchy for use in generating a second sample from the second group.

10. The method of claim 4, wherein the VAE comprises a residual cell and the residual cell comprises a first batch-normalization (BN) layer with a first Swish activation function, a first convolutional layer following the first BN layer with the first Swish activation function, a second BN layer with a second Swish activation function, a second convolutional layer following the second BN layer with the second Swish activation function, and a squeeze and excitation (SE) layer.

11. The method of claim 4, wherein the VAE comprises a residual cell and the residual cell comprises a first BN layer, a first convolutional layer following the first BN layer, a second BN layer with a first Swish activation function, and a depthwise separable convolution layer following the second BN layer.

12. The method of claim 11, wherein the residual cell further comprises a third BN layer with a second Swish activation function, a second convolutional layer following the third BN layer, a fourth BN layer following the second convolutional layer, and an SE layer following the fourth BN layer.

13. The method of claim 1, wherein the plurality of balancing coefficients includes a third balancing coefficient having a value that is determined based on a corresponding value of a Kullback-Leibler (KL) term included in the objective function.

14. The method of claim 4, wherein training the VAE comprises:

storing a first subset of activations generated by the VAE from the training dataset during a forward pass associated with training the VAE; and recalculating a second subset of activations generated by the VAE based on the stored first subset of activations during a backward pass associated with training the VAE, wherein the second subset of activations is determined based on reducing a memory consumption associated with training of the VAE.

15. The method of claim 4, wherein training the VAE comprises storing a first portion of the one or more parameters using a first precision and storing a second portion of the one or more parameters using a second precision that is lower than the first precision.

16. A non-transitory computer readable medium storing instructions that, when executed by a processor, cause the processor to perform the steps of:

inputting a training dataset into a variational autoencoder (VAE) comprising an encoder network, a prior network, and a decoder network;

training the VAE by updating one or more parameters of the VAE based on an objective function, the objective function controlling a smoothness of one or more outputs produced by the VAE when processing the set of training images, wherein training the VAE comprises:

applying, to the objective function, a plurality of balancing coefficients to generate a modified objective function, the plurality of balancing coefficients including a first balancing coefficient that has a first value during a first training period and a second balancing coefficient that has a second value, wherein the second value is higher than the first value during a second training period that occurs after the first training period, and updating the one or more parameters of the VAE based on the modified objective function; and producing generative output that reflects a first distribution of the training dataset by applying the decoder network to one or more values sampled from a second distribution of latent variables generated by the prior network.

17. The non-transitory computer readable medium of claim 16, wherein training the VAE further comprises updating the one or more parameters of the VAE based on regularization of a scaling parameter associated with batch normalization of one or more layers of the VAE via a regularization term that is added to the scaling parameter, the regularization term being based on a norm of a plurality of scaling parameters associated with a plurality of batch normalization layers of the VAE.

18. The non-transitory computer readable medium of claim 16, wherein applying the decoder network to the one or more values comprises applying a batch normalization to one or more layers of the VAE based on a momentum parameter that increases a rate at which a running statistic associated with the batch normalization catches up to a batch statistic associated with the batch normalization.

19. The non-transitory computer readable medium of claim 16, wherein the VAE comprises a hierarchy of groups of the latent variables, and wherein a first sample from a first group in the hierarchy is combined with a feature map and passed to a second group following the first group in the hierarchy for use in generating a second sample from the second group.

20. The non-transitory computer readable medium of claim 19, wherein the encoder network comprises a bottom-up model and a top-down model that perform bidirectional inference of the groups of the latent variables based on the training dataset.

21. The non-transitory computer readable medium of claim 20, wherein producing the generative output comprises:

executing the top-down model to sample the one or more values along the hierarchy of groups of the latent variables; and inputting the sampled one or more values into the decoder network to produce the generative output.

22. The non-transitory computer readable medium of claim 16, wherein applying the decoder network to the one or more values comprises recalculating batch statistics associated with a batch normalization based on the one or more values sampled from the second distribution.

23. A system, comprising:

a memory that stores instructions, and a processor that is coupled to the memory and, when executing the instructions, is configured to:

sample one or more values from a first distribution of latent variables associated with an encoder network included in a variational autoencoder (VAE), wherein the encoder network comprises a first residual cell, wherein the first residual cell comprises a first batch-normalization (BN) layer fused with a first Swish activation function, a first convolutional layer following the first BN layer fused with the first Swish activation function, a second BN layer fused with a second Swish activation function, a second convolutional layer following the second BN layer fused with the second Swish activation function, and a first squeeze and excitation (SE) layer following the second convolutional layer;

train the VAE by updating one or more parameters of the VAE based on an objective function, the objective function controlling a smoothness of one or more outputs produced by the VAE when processing the set of training images, wherein training the VAE comprises:

applying, to the objective function, a plurality of balancing coefficients to generate a modified objective function, the plurality of balancing coefficients including a first balancing coefficient that has a first value during a first training period and a second balancing coefficient that has a second value, wherein the second value is higher than the first value during a second training period that occurs after the first training period, and updating the one or more parameters of the machine learning model based on the modified objective function; and sample from a second distribution to produce generative output associated with the data.

24. The system of claim 23, wherein the one or more values are sampled using a second residual cell comprising a third BN layer, a third convolutional layer following the third BN layer, a fourth BN layer fused with a third Swish activation function, and a depthwise separable convolution layer following the fourth BN layer.

25. The system of claim 24, wherein the second residual cell further comprises a fifth BN layer fused with a fourth Swish activation function, a fourth convolutional layer following the fifth BN layer, a sixth BN layer following the fourth convolutional layer, and a second SE layer following the sixth BN layer.

* * * * *